Oct. 12, 1937.     D. B. BROOKS ET AL     2,095,237
CONTINUOUS VENTILATING PSYCHROMETER
Filed Aug. 13, 1932     2 Sheets-Sheet 2

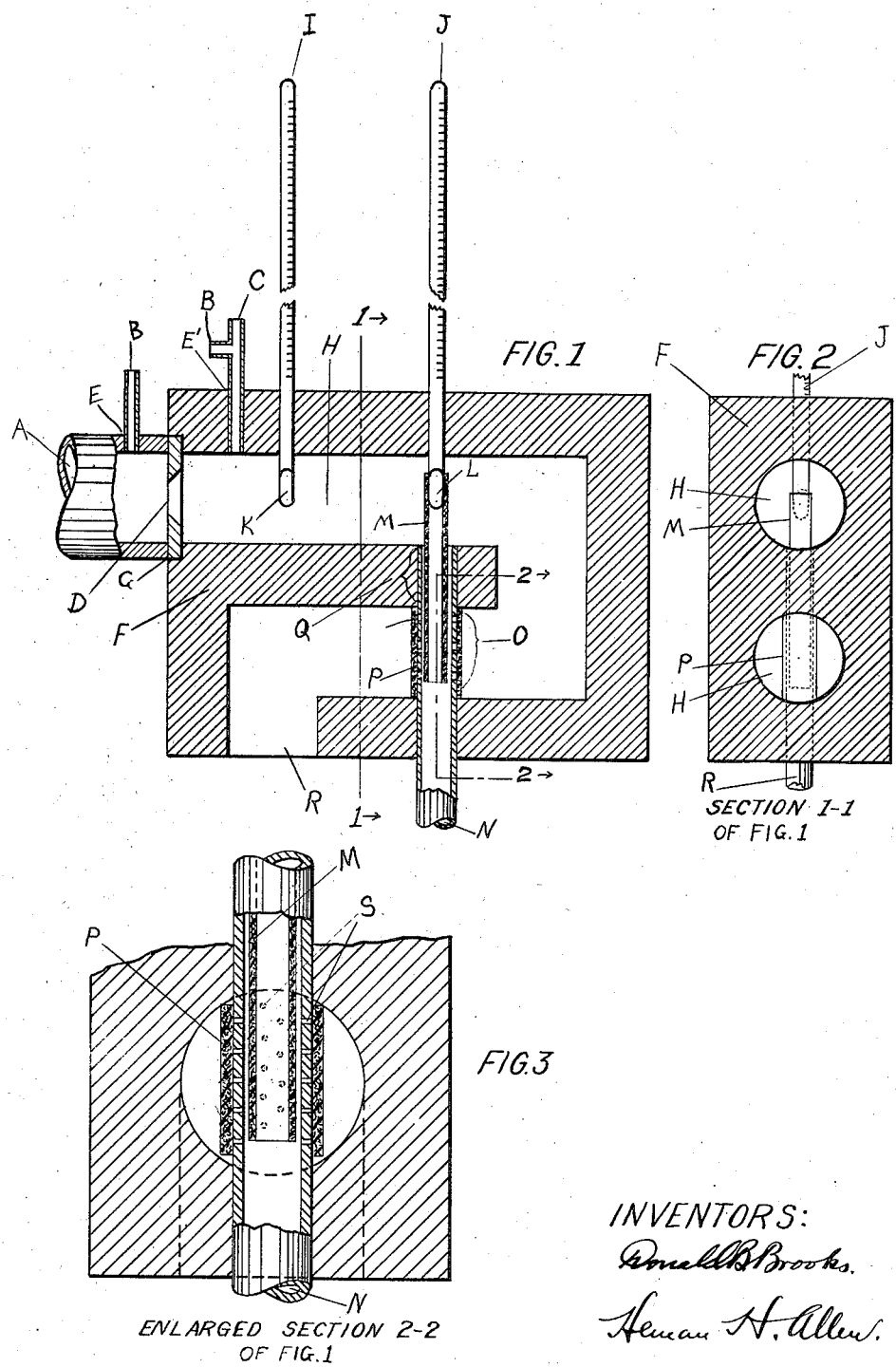

Donald B. Brooks.
Heman H. Allen.

Patented Oct. 12, 1937

2,095,237

UNITED STATES PATENT OFFICE 2,095,237

CONTINUOUS VENTILATING PSYCHROMETER

Donald B. Brooks, Chevy Chase, Md., and Heman H. Allen, Washington, D. C., assignors to the Government of the United States, represented by the Secretary of Commerce Application August 13, 1932, Serial No. 628,742

16 Claims. (Cl. 73—338)

(Granted under the act of March 3, 1883, as amended April 30, 1928; 370 O. G. 757)

The invention described herein may be manufactured and used by or for the Government of the United States for governmental purposes only without the payment to us of any royalty thereon.

Our invention relates to a psychrometer, in general, and more particularly to improvements in methods of and apparatus, known as a continuous ventilating psychrometer, for determining continuously the pressure of water vapor in the atmosphere.

When air is caused to pass the bulb of a thermometer which is covered by a fibrous substance wetted with pure water, the resulting evaporation of the water tends to change the temperature indicated by the thermometer when compared with one not so wetted, by a determinable amount for air of a given moisture content. If the air stream passing by first a dry, and then a wet bulb thermometer, as the thermometers described above are designated, be at or somewhat above a certain velocity, such an assembly is called a ventilating psychrometer. The ordinary ventilating psychrometer suffers especially from the inherent disadvantage of reading too high a temperature of the wet bulb thermometer under the conditions, (1) when the air temperature is high and the humidity is low, and (2), when the air temperature and humidity are both high.

In case (1) the reading of the wet bulb thermometer departs from that reading from which the correct humidity could be calculated, because if the rate of supply of water to the wetted fabric is maintained the same as for lower temperature, the fibrous substance or fabric is not thoroughly wetted and rises in temperature due to this cause, or if the rate of supply of water to the wetted fabric is increased to the point where the fabric is thoroughly wetted, this rate is such that the water is not cooled to the true evaporation temperature before reaching the bottom of the wet bulb, thus causing the wet bulb to give too high an indication.

In case (2), if sufficient water is supplied to the wetted fabric to maintain it in a thoroughly wetted condition, in addition to the effect of the water not being cooled to the true evaporation temperature before reaching the bottom of the wet bulb, is the effect of the conduction of heat up the wetted fabric, causing the wet bulb thermometer to read too high a temperature. Maximum accuracy of a determination of humidity is obtained the closer the indication of the wet bulb thermometer is to its lowest temperature for test humidity. In general, the effect of a given amount of error in either the reading or the indication of the wet bulb thermometer, is great in amount when the rate of change of humidity with respect to the true wet bulb temperature is high, and relatively small when this rate is low.

We have discovered that it is necessary to change the relation between velocity of air flow to quantity of water supplied to the wetted fabric, continuously, between the limits indicated, in order to obtain maximum accuracy of a determination.

Our improved type of continuous ventilating psychrometer is an improvement over the type described and has for its object a maximum accuracy of a determination of humidity. Further objects of our invention will appear more fully hereinafter as the description of the method and apparatus is developed and consists substantially in the method, construction, combination and arrangement of parts associated therewith or as will be more fully set forth hereinafter and as shown by the accompanying drawings and finally pointed out in the appended claims.

Reference is to be had to the accompanying drawings forming a part of this specification in which like reference characters indicate corresponding parts throughout the several views and in which—

Figure 1 is a view in elevation partly in section disclosing the interior detailed structures and arrangements thereof.

Figure 2 is a cross-section view at the line 1—1 of Figure 1.

Figure 3 is a cross-section view at line 2—2 of Figure 1.

Figure 4:
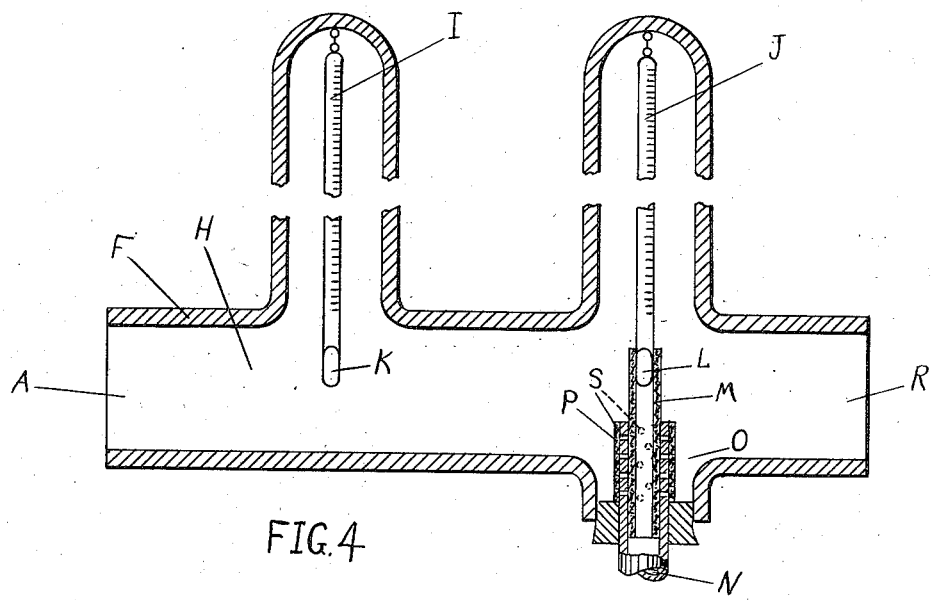
Figure 4 is a cross-section view disclosing a modified interior arrangement of the parts shown in Figure 1.

Referring to the drawings, Figure 1 illustrates a device suited for use in connection with an internal combustion engine, or similar device in which carburated or vaporous fuel is used, when it is desired to sample a small fraction of the air induced into the engine or device.

In order to obtain a predetermined power or successful operation of an engine or other device using carburated or vaporous fuel certain corrections have to be made to correct this power to standard conditions, such as pressure, temperature, humidity, etc. In order to make a correction for humidity the humidity must be accurately known. If the corrections or experiments are of the nature of determining the effect of humidity upon engines or other devices of the class described, the humidity then can be controlled and measured in accordance with the reading of our psychrometer.

The air to be sampled is drawn or pumped through the psychrometer, by suitable means, by first entering an intake pipe A provided with an orifice D, or valve if desired, on opposite sides of which is connected at E and E', if desirable, a U-gauge, not shown, connected from B with suitable connection C leading to a float chamber, not shown. A suitable connection from C is to the top of the float chamber which serves to equalize the pressure between it and the interior of the air channel H so that changes in pressure in the interior of the air channel will not affect the hydrostatic head of the water in the tube N which may be suitably connected to said float chamber, as will be described hereinafter. Pipe A is connected to a block F of the device at G in such a position that the orifice D, leading from pipe A to an air channel H in the block F, controls the air flow through the system. The U gauge, not shown, connected from B enters the block at E' and opens into the air channel H at a point between the orifice D and a dry bulb thermometer I. The dry bulb thermometer I is passed through the block F so that bulb K thereof is suspended in the center of the air channel H. A wet bulb thermometer J is passed through the block F, at a suitable distance from the dry bulb thermometer I, so that the bulb L thereof is suspended in the center of the air channel H. The wet bulb L is surrounded by a wick M of fibrous or fabric material which extends down into water in the water supply tube N. The water supply tube N extends downwardly, from its opening in the upper air channel, through the central portion of the block, indicated by bracket Q, down through the lower air channel, indicated by bracket O, then down through and out the lower portion of block F. That portion of the water supply tube N that extends through the lower air channel, indicated by bracket O, is perforated, as shown in Figure 3, at S. This portion of the water supply tube, portion O, is surrounded by a wick of fibrous or fabric material P. The air to be sampled entering pipe A is first stabilized as to maintain an even flow of air, is passed through orifice D to the air channel, across, first, the dry bulb and then the wet bulb, down through the lower air channel, across the perforated and wick covered portion of the water supply tube and is exhausted at the outlet R. The air passing over the dry bulb is in the condition in which it was when entering the orifice D but due to evaporation of the water from the wick M, the air upon passing this wet wick changes to a different temperature. The air passing over that portion of the water supply tube which is perforated and surrounded by a wet wick P causes the water in the supply tube to reach a cooler temperature and hence before the water reaches the exposed portion of the wick M it has been brought to or near evaporation temperature. The wetted wick M has thus been brought to evaporation temperature corresponding to the air, the humidity of which is being determined, and thus bringing the bulb L of the wet thermometer J to true evaporation temperature. If the humidity of the air requires an increase in the flow of water in the tube M, true evaporation temperature will still be maintained at the wick M due to the fact that the water supplied is already at or near true evaporation temperature. The water in supply tube N is brought to or near the evaporation temperature corresponding to the air by evaporation from the wetted fibrous material P in the same manner as described concerning the wick M. The perforations or orifices S in the tube N are sufficient in number and so arranged to maintain the outside fabric P at approximately uniform wetness and sufficiently small in size so that the rate of water flow is extremely slow. A constant hydrostatic head of water is maintained in the tube by suitable means, not shown. A suitable means has been found to be by equalizing the pressure between the interior H and the top of the float bowl, referred to above, to which the water tube is connected. The float bowl should be maintained at a suitable height above the desired level of the water in the tube N.

In this arrangement it will be seen that we have provided a system in which the fluid supplied to the wet bulb is precooled by the air flowing through the system itself which permits the evaporation of the fluid at the wet bulb to register the correct wet bulb temperature and which can be compared with the dry bulb temperature without corrections first being necessary.

In developing the construction of the foregoing apparatus we have utilized a new and useful process for determining the vapor content of a gas which process consists in obtaining the temperature of a condensed vapor which has been brought to substantially adiabatic evaporation temperature with respect to the gas being tested. That is to say, the substance supplied to the wet bulb is brought to substantially adiabatic evaporation temperature and this substance is maintained at this temperature by evaporation into the gas which is being measured.

It is to be understood that the phrase "adiabatic evaporation temperature" as used herein and in the appended claims means substantially the temperature of a liquid constantly evaporating in atmosphere of constant properties and having no heat exchange between the liquid and any body other than the atmosphere into which the liquid is evaporating, which atmosphere in applicants' system is the gas being tested or measured. Further defined—the adiabatic evaporation temperature of a liquid-gas system is that temperature at which the liquid of the system will be neither warmed nor cooled when, for example, it is sprayed into the gas of the system.

The substance to be evaporated, to be brought to adiabatic evaporation temperature, and to be supplied to the wet bulb, need not be limited to a liquid form but may include any substance which will evaporate to a perceptible degree.

The straight run length of the channel in which the thermometers are inserted, the distance between the commencement and termination of the straight run and each thermometer, respectively, as well as the distance between the thermometers, must be approximately correctly determined in accordance with the laws of hydraulic flow in pipes.

The device and particularly the water supply tube should be appropriately covered or painted or otherwise insulated to repel any heat from the engine or other device to which it is attached.

Referring now to Figure 4, this arrangement of parts is preferred for use when it is not undesirable to reject a large quantity of air. This type is simpler in construction and can be made somewhat more precise in operation than the device illustrated in Figure 1 for purposes of testing and for maximum accuracy of a determination of humidity. The difference being that the flow of air to be tested is passed over the precooling section of the water supply tube, indicated by O, P, and S, in the same flow that is passed over the bulb L and wick M. This arrangement of parts eliminates the necessity of limiting the entire device to a small unit and also eliminates the necessity of restricting the amount of air passed through the system. The thermometers as shown in Figure 4 may be enclosed in a casing or shield of any suitable material. In this arrangement it will also be seen that we have provided a system in which the fluid supplied to the wet bulb is pre-cooled by the air flowing thru the system itself which permits the evaporation of fluid at the wet bulb to register the correct wet bulb temperature which can be compared with the dry bulb temperature without corrections first being necessary.

In the operation of our continuous ventilating psychrometer the true humidity, relative humidity, etc. is to be determined by the usual standard chart from the readings of the dry and wet bulb thermometers of our continuous ventilating psychrometer.

While we have illustrated and described the apparatus and system of operation of our invention it is to be understood that various modifications and adaptations thereof to different uses may be made without departing from the spirit of our invention as defined by the scope of the claims appended hereto.

What we claim as new and desire to secure by Letters Patent of the United States is as follows:

1. A device of the class described having a fluid supply container, said container having small orifices, said orificed area being covered with absorbent fibrous material, said orifices being suitable in size to permit sufficient fluid to seep therethrough to maintain said covering in a wetted condition, a fibrous material extending into said container and submerging in the fluid a suitable distance to maintain the unsubmerged portion in a wetted condition by capillary action, said unsubmerged portion being substantially in contact with a thermometer bulb, said parts being exposed to air.

2. In a psychrometer, the combination of a casing having a channel bent back upon itself, a gas intake at one end of said channel, a dry bulb thermometer adjacent said intake, a wet bulb thermometer positioned in said channel in line with said dry bulb thermometer and a conduit extending through said bent back portion of said channel and into the channel surrounding the wet bulb thermometer, said conduit, extending through said bent back portion, having small orifices surrounded with fibrous material whereby the fluid in said conduit is pre-cooled by gas flowing through said channel around said conduit.

3. In a psychrometer, the combination of a casing having a channel, a gas intake at one end of said channel, a dry bulb thermometer adjacent said intake, a wet bulb thermometer positioned in said channel in line with said dry bulb thermometer and a conduit extending into said channel, a fibrous material extending from said conduit and surrounding said wet bulb, said conduit having small orifices and covered with fibrous material whereby the fluid in said conduit is pre-cooled by gas flowing through said channel around said conduit.

4. A device of the class described having an elongated air channel, one end of which is provided with an intake and the other serving as an exhaust, through which a pre-determined amount of air at a pre-determined pressure and density may be caused to flow, dry and wet bulb thermometers respectively, the bulbs of which being suspended in said air channel, said wet bulb being surrounded by an absorbent fibrous material, a fluid container into which said absorbent material extends, said fluid container having a portion extending into said air channel and having a series of orifices through which a portion of the fluid in said container may seep, a fibrous covering about said orificed portion, whereby said air to be tested may be passed around the dry bulb in its predetermined state and then around the wet bulb which bulb is at an evaporation temperature brought about by precooling the fluid supplied to the wetted fibrous material in contact with said wet bulb by the flow of air through said device and over the fibrous covering about said orificed portion.

5. A device of the class described having an intake and an air channel into which the intake leads, a dry bulb thermometer and a wet bulb thermometer extending into the air channel and arranged a predetermined distance apart and in such positions that air at a predetermined temperature, density and pressure may be caused to pass around the dry bulb and then around the wet bulb, an absorbent fibrous material contacting the wet bulb and extending into a fluid, a container for said fluid, a portion of the container extending into the air channel, said portion having orifices through which the fluid may seep, and an absorbent fibrous material covering the orificed portion.

6. In a device of the class described, the combination of an air conduit bent back upon itself, a fluid container extending between the main and bent back portions of the air conduit and having orifices in the walls thereof within said bent back portions of the air conduit, a thermometer the bulb of which is located in the air conduit contiguous to the end of the fluid conduit, a wick within the fluid conduit and contacting the bulb of the thermometer, and an absorbent material surrounding the orificed portion of the fluid conduit.

7. In a device of the class described, the combination of an air conduit bent back upon itself, a fluid conduit extending into the bent back portion of the air conduit, a thermometer the bulb of which is located in the air conduit, a wick within the fluid conduit and contacting the bulb of the thermometer, and means within the bent back portion of said air conduit for preconditioning the temperature of the fluid, flowing along the wick, with respect to the temperature of the air passing through the air conduit.

8. In a device of the class described, the combination of a fluid conduit having orifices in the walls thereof, a thermometer, a wick within the fluid conduit and contacting the bulb of the thermometer, an absorbent material surrounding the orificed portion of the fluid conduit, and an air conduit surrounding the bulb contacting portion of the wick and the absorbent material whereby the temperature of the fluid passing along the wick is predetermined prior to contacting the bulb of the thermometer.

9. In a device of the class described, the combination of a fluid conduit having orifices in the walls thereof at a point removed from the end of said conduit, a thermometer, a wick within the fluid conduit and contacting the bulb of the thermometer, an absorbent material surrounding the orificed portion of the fluid conduit, and an air conduit one section of which surrounds the bulb contacting portion of the wick and the other section of which surrounds the absorbent material.

10. In a device of the class described, the combination of an orificed open ended fluid conduit, a wick within the fluid conduit and exposed at one end thereof, and means over the orifices in the walls of the conduit for conditioning the temperature of the fluid flowing along the wick.

11. In a device of the class described, the combination of an open ended fluid conduit having orifices in the wall thereof, a wick within the fluid conduit and exposed at one end thereof, a thermometer, the bulb of which contacts the exposed end of the wick, an absorbent material surrounding the orificed portion of the fluid conduit, and an air conduit surrounding the exposed end of the wick and the absorbent material.

12. In a device of the class described, the combination of an open ended fluid conduit having orifices in the walls at points removed from the ends thereof, a wick within the fluid conduit and exposed at one end thereof, a thermometer, the bulb of which contacts the exposed end of the wick, an absorbent material surrounding the orificed portion of the fluid conduit, and an air conduit surrounding the exposed end of the wick at one portion of the air conduit and the absorbent material at another portion of the air conduit.

13. In a device of the class described, the combination of an elongated air conduit, a fluid conduit ending in said air conduit and having orificed walls, a wick within the fluid conduit and extending from the open end of the fluid conduit into the air conduit, the orificed portion of the fluid conduit being exposed to the air conduit at a point removed from the open end of the fluid conduit.

14. In a device of the class described, the combination of an elongated air conduit, a fluid conduit ending in said air conduit, a wick within the fluid conduit and extending from the open end thereof and exposed in the air conduit, said fluid conduit being orificed and exposed to the air conduit at points removed from the exposed portion of the wick, and an absorbent material surrounding the orificed portion of the fluid conduit.

15. In the process of computing the vapor content of a gas from the respective temperatures of the gas and a liquid evaporating into said gas, the step of bringing the liquid supplied for evaporation to substantially adiabatic evaporation temperature with respect to the gas to be tested by evaporating a portion of said liquid supply into the gas prior to supplying said liquid for temperature measurement.

16. In a system for determining the vapor content of a gas involving the transfer of a liquid into a gas by evaporation in which the temperature of said liquid is lowered, the steps of cooling said liquid to substantially adiabatic evaporation temperature with respect to said gas, further cooling a portion of said liquid by gas circulation, and thereafter measuring the temperature of the further cooled liquid.

DONALD B. BROOKS.
HEMAN H. ALLEN.